(12) United States Patent
Hogan

(10) Patent No.: US 6,178,146 B1
(45) Date of Patent: Jan. 23, 2001

(54) OPTICAL STORAGE DEVICE FOR WRITING DATA AT A CONSTANT BIT DENSITY DURING A CAV MODE OF OPERATION

(75) Inventor: Joshua N. Hogan, Los Altos, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/211,393

(22) Filed: Dec. 14, 1998

(51) Int. Cl.$^7$ ........................................................ G11B 7/00

(52) U.S. Cl. .................................. 369/47; 369/59; 369/48

(58) Field of Search .................................. 369/47, 48, 59

(56) References Cited

U.S. PATENT DOCUMENTS

| 5,210,733 | * | 5/1993 | Yamaguchi et al. | 369/48 |
| 5,854,778 | * | 12/1998 | Shimizu et al. | 369/59 |
| 5,883,866 | * | 3/1999 | Shimizume et al. | 369/50 |

* cited by examiner

*Primary Examiner*—Aristotelis M. Psitos

(57) ABSTRACT

An optical read/write drive such as a DVD+RW drive includes a write clock generator that allows new data to be written to an optical disc at a constant linear density while the drive is operating in a constant angular velocity mode. The write clock generator generates a zone write clock that is supplied to a laser driver during a write operation. The write clock generator can adjust the frequency of the zoned write clock to correspond to different zones of the optical disc.

21 Claims, 8 Drawing Sheets

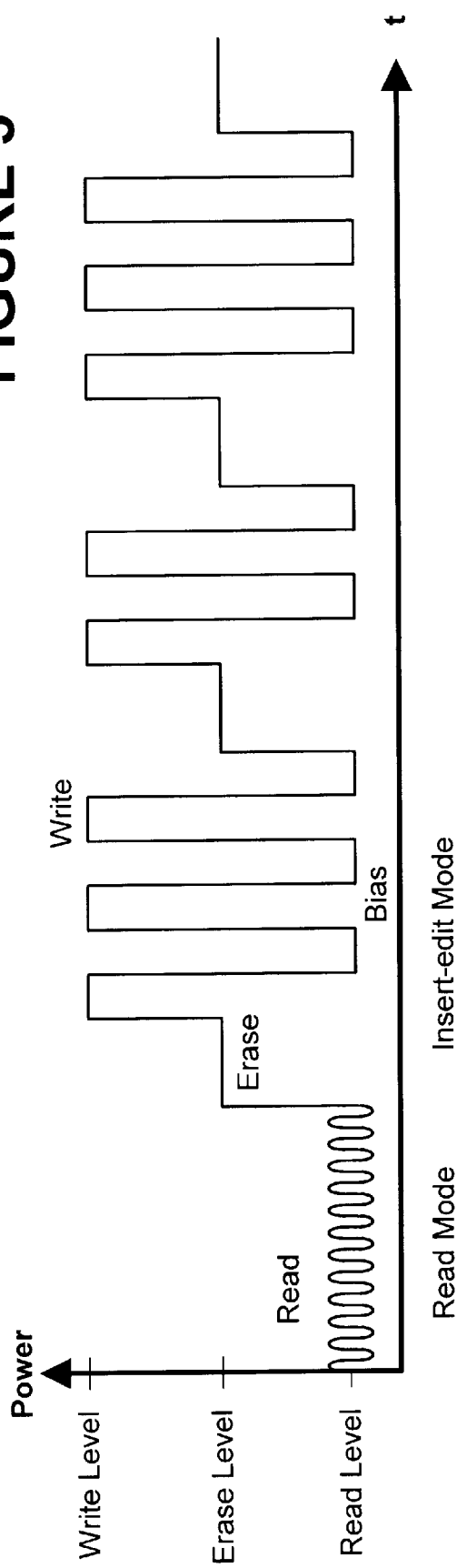

OPTICAL STORAGE DEVICE FOR WRITING DATA AT A CONSTANT BIT DENSITY DURING A CAV MODE OF OPERATION

BACKGROUND OF THE INVENTION

The invention relates generally to optical data storage and specifically to an apparatus and method for writing data to an optical storage medium such as a DVD or a CD. The invention also relates to a method and apparatus for generating zoned write clocks.

"Read/write" drives can write data to "read/write" optical discs. Read/write optical discs include discs that allow new data to be written only once and optical discs that allow new data to be written many times. A DVD+RW disc is an example of a read/write disc that allows new data to be written many times.

A typical read/write drive includes a spindle motor for spinning the disc and an optical pickup unit for reading and writing data to the disc. The read/write drive is typically operated in a constant linear velocity mode. As the optical pickup unit is moved along the disc in a radial direction, the angular rate of the disc is adjusted so that data is read out at a constant linear velocity.

It is more desirable to operate the read/write drive in a constant angular velocity (CAV) mode. A read/write drive that spins the disc at a constant angular velocity allows data to be accessed faster because the angular velocity of the disc is not repeatedly increased and decreased.

It is even more desirable for the read/write drive to operate in a CAV mode and store the data on the disc at a constant bit density. Resulting is data storage at a constant linear density (CLD). Maximum storage capacity can be achieved if the data is stored at a constant linear density.

Operating a read/write drive in a CAV mode while storing data at a constant bit density can be problematic. Frequency at which new data is written to the disc is constantly adjusted to compensate for the varying radial distance of the optical pickup unit relative to the center of the disc.

A typical solution involves the use of zoned constant angular velocity. Different write clock frequencies are assigned to different zones of the disc. As the optical pickup unit enters a zone, the new data is written to the disc at a frequency assigned to the zone.

However, frequency of the newly written data varies within each zone, and abrupt changes in frequency occur from zone to zone. During readback of the newly written data, the variations and abrupt changes in bit density might cause problems for clocks and data recovery circuitry. Consequently, the variations and abrupt changes might render portions of the read/write disc effectively unreadable by the read/write drive or by another drive.

The problems resulting from abrupt variations may be overcome by the use of "edit gaps" (also known as a "splice areas"). The new data is written to the disc in blocks, and the blocks of newly written data are separated by the edit gaps. The edit gaps allow sufficient time for the clocks and data recovery circuitry to recover from abrupt frequency changes before data is read from the next block.

However, the use of edit gaps has its drawbacks. Storage capacity of the read/write disc is reduced because data is not stored in the edit gaps.

Moreover, the edit gaps might render portions of the read/write disc unreadable by existing read-only drives. Older read-only drives that were developed prior to newer generation read/write drives might not be capable of processing the edit gaps. Unless an existing read-only drive is somehow modified to navigate past the edit gaps, it will have difficulty reading the data stored on the read/write disc.

There is a need for a read/write device that can operate in a CAV mode and write new data to an optical disc at a relatively constant bit density. There is also a need for such a device that does not rely upon edit gaps to overcome the problem arising from abrupt frequency changes in newly written data.

SUMMARY OF THE INVENTION

These needs are met by the present invention, which may be regarded as an optical drive that can operate in a CAV mode yet write data to an optical disc at a relatively constant bit density and without abrupt changes in bit density. The drive makes use of a stable reference signal that may be provided, for example, by a shaft encoder or a reference track on the disc. Frequency of the stable reference signal is proportional to angular rate of the drive's spindle motor.

The drive generates a primary zone clock having a period that is inversely proportional to reference signal frequency divided by a first non-zero number. The drive delays the primary zone clock over a plurality of delay intervals and generates a zoned write clock from a sequence of delayed primary zone clocks. The zoned write clock has a period determined by the period of the primary zone clock and delay interval. The delay intervals are chosen in a sequence to maintain a relatively constant period of the zoned write clock.

The drive changes the first number when a sequence of the delay intervals rolls over. The first number is changed such that the period of the zoned write clock remains relatively constant.

The zoned write clock is supplied to a device such as a laser driver during a write operation. If the angular velocity of the disc is reduced, frequency of the zone clock pulses is decreased to maintain a constant linear bit density. If the angular velocity of the disc is increased, the frequency of the zone clock pulses is increased to maintain a constant linear bit density.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 is an illustration of laser power within the DVD drive during exemplary read and write operations;

FIG. 6 is an illustration of data written to the DVD disc during the write operation of FIG. 5;

DETAILED DESCRIPTION OF THE INVENTION

Figure 2:
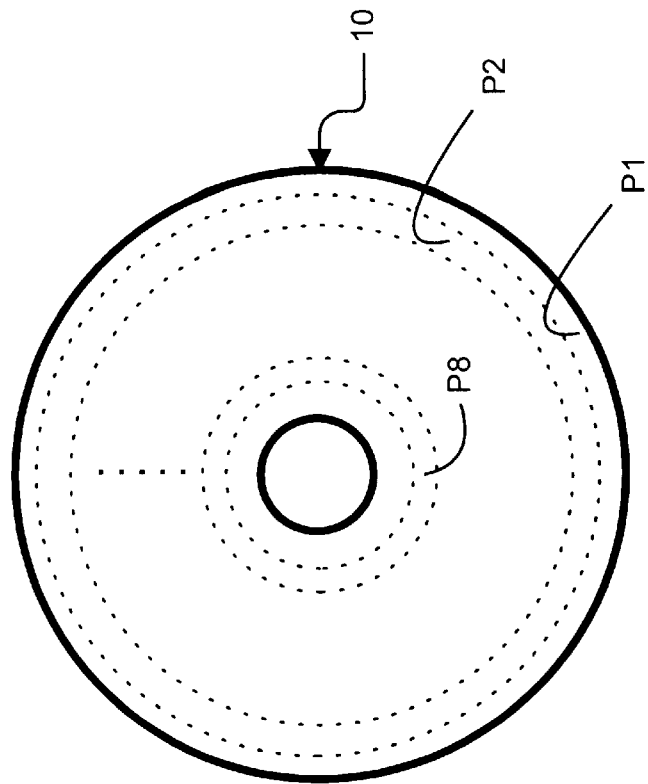
FIG. 2 is an illustration of primary zones on the DVD disc.

As shown in the drawings for purposes of illustration, the present invention is embodied in an optical read/write drive, which can write new data to a read/write optical disc. The read/write drive generates a zoned write clock that is supplied to a laser driver during a write operation. The zoned write clock is generated in such a manner that abrupt changes in frequency of the newly written data are avoided. Consequently, the read/write drive can write data to an optical disc at a constant linear density, without the use of edit gaps.

In the paragraphs that follow, the read/write drive will be described as a DVD read/write drive and the read/write optical disc will be described as a DVD read/write disc. First, a description of the DVD read/write disc will be provided. Then a description of the DVD read/write drive will be provided.

Figure 1:
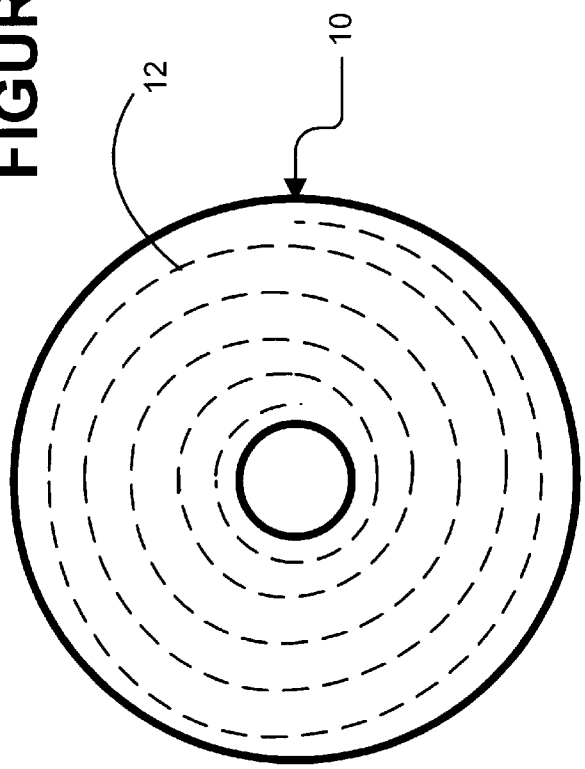
FIG. 1 is an illustration of a DVD disc.

FIG. 1 shows a phase-change DVD disc 10, hereinafter referred to as the disc 10. The disc 10 includes a rigid substrate that is coated with a recordable medium. The recordable medium may be made of a read/write material such as a phase change material. A spiral groove 12 is embedded in the disc 10. A laser beam can be used to heat and cool the recordable medium quickly to form marks having an amorphous state. The laser beam can also be used to erase the marks from the recordable medium by annealing the marks into a crystalline state. Data is represented by patterns of marks on the disc 10.

It is understood that FIG. 1 merely provides an illustration to facilitate an understanding of the invention; it is not intended to show the disc 10 in detail or proper scale. For instance, the number of spirals in the groove 12, the thickness of the groove 12, etc., are not illustrated to scale.

FIG. 2 shows a plurality of primary zones P1 to P8 of the disc 10. The dashed lines defining the primary zones P1 to P8 are imaginary. Although eight primary zones P1 to P8 are implied, the disc 10 is not limited to eight primary zones.

Figure 2A:
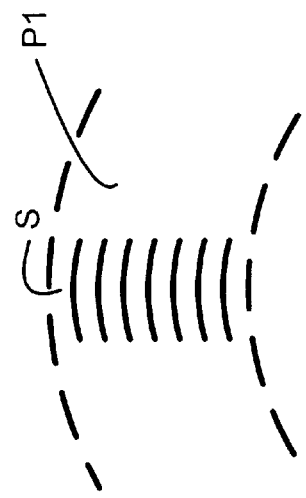
FIG. 2a is an illustration of subzones on the DVD disc.
Figure 4:
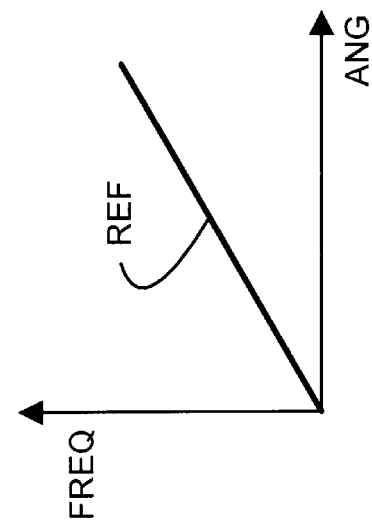
FIG. 4 is an illustration of the relationship of angular velocity of the disc to frequency of a stable reference signal.

FIG. 2a shows a plurality of subzones S within the first primary zone P1. There would also be an equal number of subzones within other primary zones on the disc 10 (for example, there would also be eight subzones S between the lines defining the second primary zone P2). The lines defining the subzones S are imaginary. Although eight subzones within a primary zone are shown, the disc 10 is not limited to eight subzones.

Figure 3:
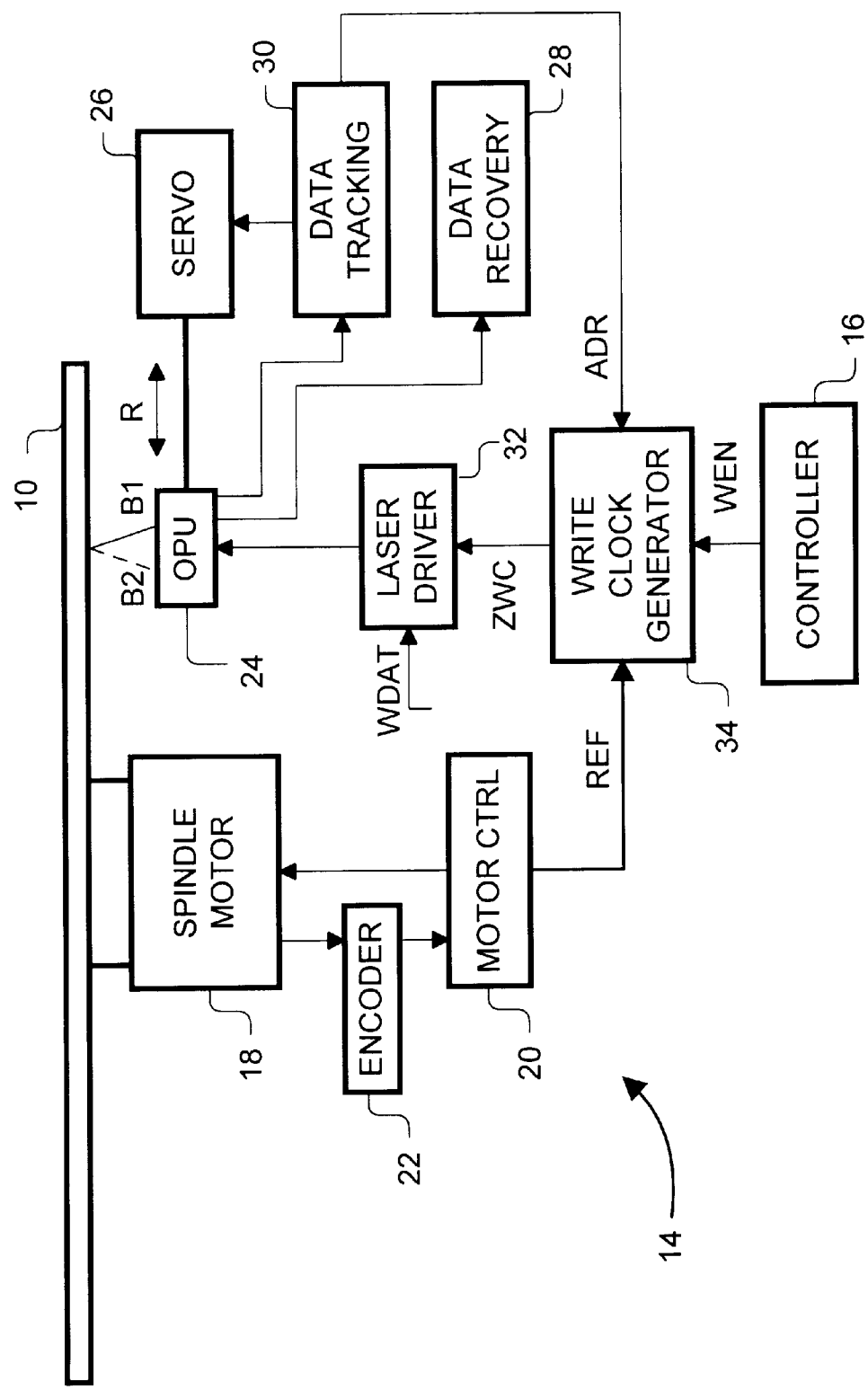
FIG. 3 is a block diagram of the disc and a DVD drive according to the present invention.

FIG. 3 shows the disc 10 and a DVD drive 14 that follows a DVD format specification such as the DVD+RW format specification. The DVD drive 14 includes a controller 16 for receiving a mode of operation from a host (e.g., a personal computer). The modes of operation include a read mode and may include various write modes such as a write-append mode and an insert-edit mode. The controller 16 also, among other things, receives addressing information from the host.

The DVD drive 14 also includes a spindle motor 18 and motor control 20 for rotating the disc 10 at a constant angular velocity during read and write operations. The DVD drive 14 also includes a shaft encoder 22 that generates a stable reference signal REF. An example of a relationship of angular velocity ANG of the disc 10 to frequency FREQ of the reference signal REF is illustrated in FIG. 3. Although a linear relationship is illustrated, the actual relationship may or may not be linear.

The DVD drive 14 further includes an optical pickup unit 24 and a tracking servo 26 for moving the optical pickup unit 24 along a radial direction of the disc 10. The radial direction is indicated by the arrow R. The optical pickup unit 24 and the tracking servo 26 can have a conventional construction. The optical pickup unit 24 may include a laser for generating a laser beam B1; and means (e.g., an optics assembly and photodetector array) for detecting the modulated beam B2 and converting the modulated beam B2 into an electrical readback signal RBK during the read mode.

A conventional data recovery circuit 28 recovers data from the readback signal RBK. The recovered data is sent to conventional circuitry (not shown) for demodulating the recovered data, arranging the demodulated data in error correction code ("ECC") blocks, and performing error correction on the ECC blocks. The error-corrected data is sent to the host.

A conventional data tracking circuit 30 processes another output of the optical pickup unit 24 to derive a tracking signal and address information. The tracking servo 26 moves the optical pickup unit 24 such that the laser beam B1 tracks the spiral groove 12 as the disc 10 is rotated.

The laser of the optical pickup unit 24 is driven by a laser driver 32. Power of the laser beam B1 depends upon the mode of operation of the drive 14. The laser power is controlled between various levels including a read level for reading data from the disc 10, an erase level for erasing data on the disc 10, and a write level for writing data to the disc 10 (see FIGS. 5 and 6).

Write operations are performed by supplying a data signal WDAT and a zoned write clock ZWC to the laser driver 32. Before data is written to the disc 10, however, the data is ECC-encoded and modulation-encoded. The data signal WDAT can be generated by conventional circuitry (not shown).

A write clock generator 34 supplies the zoned write clock ZWC to the laser driver 32. Frequency of the zoned write clock ZWC is varied such that the new data is written to the disc 10 at a constant linear density while the disc 10 is being rotated at a constant angular velocity. Additionally, the zoned write clock ZWC is generated in such a manner that abrupt changes in frequency of the newly written data are avoided.

An exemplary read operation followed by an insert-edit operation is illustrated FIGS. 5 and 6. During the read operation, laser power is modulated at about the read level. During the insert-edit operation, laser power is further modulated to overwrite previously written data OLD with new data NEW. The previously written data OLD is shown in dashed lines and the new data NEW is shown in solid lines. Edges in write pulses are aligned with edges in the zoned write clock ZWC. The zoned write clock ZWC ensures that the new data is written to the disc 10 at a relatively constant linear density.

During a write operation, the new data is written in blocks. Typically, the length of each block of new data is 32 kilobytes. Typically, the blocks of data will be written to contiguous locations on the disc 10. In a short write operation involving only a few blocks of new data, contiguous blocks might be written within a single primary zone of the disc 10. In a long write operation involving many blocks of new data, contiguous blocks might be written across several primary zones of the disc 10.

Figure 7:
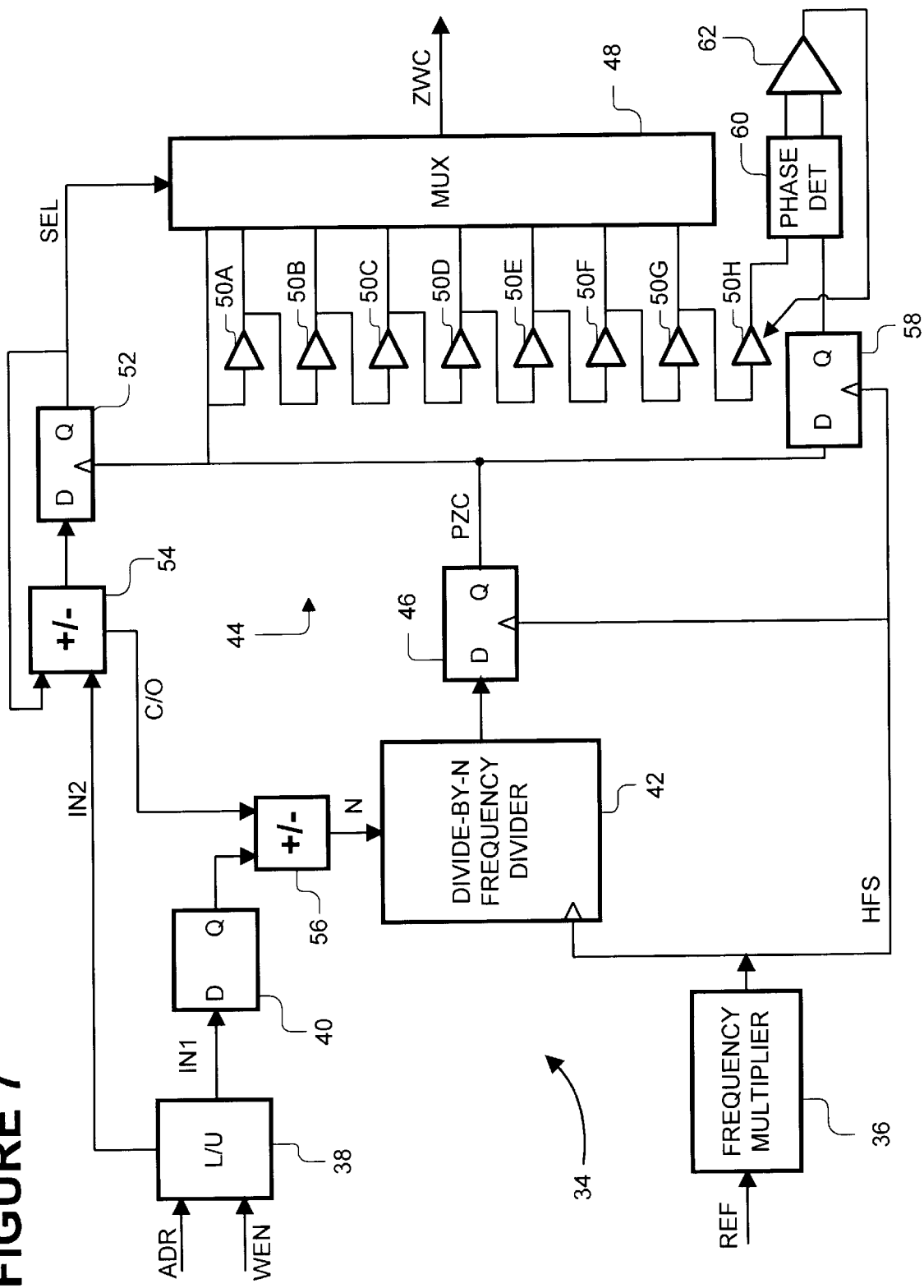
FIG. 7 is a block diagram of a write clock generator for the DVD drive.

FIG. 7 shows the write clock generator 34 in greater detail. The write clock generator 34 includes a frequency multiplier 36, which receives the reference signal REF from the encoder 22. The frequency multiplier 36 generates a high frequency signal HFS that is phase locked to the reference signal REF but has a proportionally higher frequency. For example, the reference signal REF may have a frequency of 4 MHz and the high frequency signal HFS may have a frequency of 512 MHz. The frequency multiplier 36 may be a phase lock loop. Increasing the frequency increases the number of edges for timing purposes.

The write clock generator 34 receives the starting address ADR of the first block of new data. The starting address ADR may be supplied by the data tracking circuit 30 (see FIG. 3). The write clock generator 34 also receives a write enable signal WEN from the controller 16. When the write enable signal WEN indicates the beginning of a write operation, a lookup table 38 decodes the address ADR into first and second values IN1 and IN2. The first and second lookup table values IN1 and IN2 correspond to the primary zone and subzone in which the starting address ADR lies.

The first value IN1 is loaded into a first latch 40. An output of the first latch 40 supplies a signal representing a divisor N.

The high frequency signal HFS is supplied to an input of a divide-by-N frequency divider 42. An output of the frequency divider 42 generates a primary zone clock PZC having a frequency that is 1/N times the frequency of the high frequency signal HFS. For the 512 MHz high frequency signal HFS, values for N might include N=8, N=19 and the integers therebetween. Sequencing from N=19 to N=8 might produce twelve primary zone clock frequencies ranging from 25.6 MHz (for the last primary zone P8) to 64 MHz (for the first primary zone P1) at a maximum step of 7.11 MHz. The frequency divider 42 may be, for example, a phase lock loop or a modulo-N counter. (Note that a DVD drive would typically have the 25.6 MHz zone as the first zone. However, to simplify the explanation of the present invention, the 64 MHz zone is used as the first zone).

A delay circuit 44 increases the period T of the primary zone clock PZC by an interval DT. An output of the delay circuit 44 provides a zoned write clock ZWC, which has a period of T+DT. The delay period DT and, therefore, the frequency of the zoned write clock ZWC correspond to a subzone of a primary zone. Thus, the frequency of the zoned write clock ZWC can be adjusted to correspond to a primary zone and subzone by selecting an appropriate delay period DT.

The second lookup table value IN2 establishes the delay period DT. If IN1=8 causes the primary zone clock PZC to have a frequency of 64 MHz, and IN2=0 causes the delay period to be DT=0, the zoned write clock ZWC will have a frequency of 64 MHz. If IN1=8 causes the primary zone clock PZC to have a frequency of 64 MHz, and IN=1 causes the delay period to be DT=244 picoseconds, the zoned write clock ZWC will have a frequency of about 63.01 MHz.

The delay circuit 44 includes a second latch 46 and a multiplexer 48. The primary zone clock PZC is latched by the second latch 46 and supplied to a first input of the multiplexer 48. The delay circuit 44 further includes a number M of delay elements 50A to 50H that are cascaded. The latched primary zone clock PZC is also supplied to an input of the first delay element 50A and propagated to the last delay element 50H. Each delay element 50A to 50H may include a logic gate having a delay interval Δ that is dependent upon power supplied thereto. If the M delay elements 50A to 50H are identical, the output of each delay element will delay the primary zone clock ZWC by an additional delay interval. Thus, the first delay element 50A will delay the primary zone clock by one interval Δ, the second delay element 50B will delay the primary zone clock by two interval 2Δ, the third delay element 50C will delay the primary zone clock by three intervals 3Δ, etc. Outputs of the first seven delay elements 50A to 50G are supplied to inputs two to eight of the multiplexer 48.

A select line SEL causes the multiplexer 48 to select one of the following: the output of the second latch 46 (i.e., the undelayed primary zone clock ZWC) and the outputs of the first seven delay elements 50A to 50G. An output of the multiplexer 48 provides the zoned write clock ZWC. The outputs of the second latch 46 and the seven delay elements 44A to 44G are selected in a sequence that adjusts the delay period DT such that the frequency of trailing edges in the zoned write clock ZWC corresponds to a subzone of the a primary zone.

Figure 8:
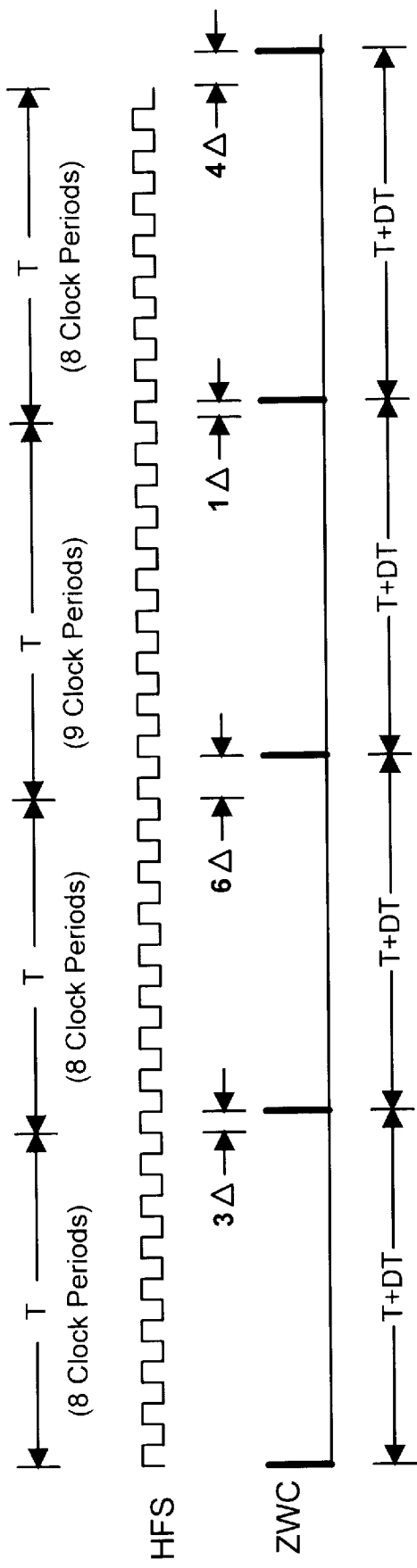
FIG. 8 is a timing diagram of a high frequency signal and a zoned write clock generated by the write clock generator.

FIG. 8 illustrates how a 61.13 MHz zoned write clock ZWC is derived from delayed primary zone clocks. The 61.13 MHz zoned write clock ZWC corresponds to the fourth subzone of the first primary zone P1. The lookup table 38 decodes an address lying in the fourth subzone and produces values IN1=8 and IN2=3. A value of N=8 is loaded into the first latch 40, whereby the primary zone clock PZC has a frequency of 64 MHz and a period of about T=1.95 nanoseconds. Each delay interval is Δ=244 picoseconds (about one-eighth of a clock period of the 512 MHz high frequency signal HFS). Therefore, increasing the period T of the primary zone clock by 3Δ will produce a zoned write clock having a frequency of 61.13 MHz.

The output of the second latch 46 (the undelayed primary zone clock PZC), is selected, then the output of the third delay element 50C (the primary zone clock delayed by 3Δ) is selected after eight pulses of the high frequency signal HFS, and then the output of the sixth delay element 5OF (the primary zone clock delayed by 6Δ) is selected after another eight pulses of the high frequency signal HFS. Selecting the delay intervals in such a sequence causes the trailing edges of the zoned write clock ZWC to be generated at a frequency of 61.13 MHz.

To generate the next trailing edge of the zoned write clock ZWC, the output of a ninth delay element is not selected (since a ninth delay element is not used). Instead, the divisor is incremented to N=9 and the delay interval sequence rolls over. Instead of selecting the ninth input of the multiplexer 48, the first (that is, modulo-8 of number 9 in the sequence) input is selected. Thus, the output of the first delay element 50A is selected after N=9 pulses of the high frequency signal HFS. Although the fourth trailing edge of the zoned write clock is delayed by only 1Δ, the period T of the primary zone clock PZC is increased. The net effect is to maintain the period of the zoned write clock ZWC at a relatively constant T+DT and the frequency of the zoned write clock ZWC at a relatively constant 61.13 MHz. For the fifth trailing edge of the zoned write clock ZWC, the divisor N is returned to N=8 and the output of the fourth delay element 50D is selected after another eight pulses of the high frequency signal HFS.

Returning to FIG. 7, the write clock generator 34 further includes a third latch 52, and first and second adders 54 and 56 for generating the multiplexer select signal SEL and incrementing the divisor N. The first adder 54 is an M-bit adder with carryout. At every pulse of the primary zone clock PZC, the value in the third latch 52 is increased by the second lookup table value IN2. An output of the third latch 52 provides the multiplexer select signal SEL. An initial value for the third latch 52 can be set by the lookup table 38.

When the sum of the first adder 54 exceeds the value $2^M-1$, the first adder 54 generates a carry out signal. The carry out signal, which indicates that the delay interval sequence has rolled over, causes the second adder 56 to increment the divisor N.

Thus, if the values for IN1 and IN2 are IN1=8 and IN2=3, the sequence on the outputs of the first and third latches 40 and 52 will be N=8 and SEL=0, N=8 and SEL=3, N=8 and SEL=6, N=9 and SEL=1, N=8 and SEL=4, N=8 and SEL=7 and so on.

The sequencing of delay intervals is continued until a new block of data is written to a different primary zone/subzone. Before the new block is written to the different primary zone/subzone, the lookup table 38 generates new values IN1/IN2. The first latch 40 is set to the new first value IN1, and the first adder 54 begins incrementing the select signal SEL by the new second value IN2. The new block is then written to the different primary zone/subzone of the disc 10.

The eighth delay element 50H is used in combination with a fourth latch 58, a phase detector 60 and an amplifier 62 for calibrating the delay elements 50A to 50G for temperature drift, variations in power, etc. The last delay element 50H should delay the primary zone clock PZC by one full cycle (i.e., N pulses of the high frequency clock signal). Therefore, an output of the phase detector 60 should indicate a zero phase difference between the output of the last delay element 50H and the output of the second latch 46. A non-zero phase difference will be indicative of delay element error caused by temperature drift, variations in power, etc. Any phase error that occurs is used to adjust the delay intervals of each of the delay elements 50A to 50H (e.g., by changing the power supplied to each of the delay elements 50A to 50H) until the output of the phase detector 60 is nulled.

Thus, the write clock generator 34 can generate a zoned write clock ZWC having discrete frequencies that correspond to different primary zones and subzones of the disc 10. Using M=8 delay elements, divisors N=8 to N=19, and a high frequency signal having a frequency of 512 MHz, a total of 93 discrete clock frequencies can be generated for 93 different subzones. A partial listing of the discrete frequencies is shown in Table 1 below.

TABLE 1

| PZC Frequency (HFS Freq/N) | Delay (SEL) | ZWC Frequency (MHz) | Delay (SEL) | ZWC Frequency (MHz) |
|---|---|---|---|---|
| 512 MHz/8 | 0 | 64.00 | 1 | 63.01 |
| | 2 | 62.06 | 3 | 61.13 |
| | 4 | 60.23 | 5 | 59.36 |
| | 6 | 58.51 | 7 | 57.69 |
| 512 MHz/9 | 0 | 56.89 | 1 | 56.50 |
| 512 MHz/10 | 0 | 51.20 | 1 | 50.88 |
| 512 MHz/11 | 0 | 46.55 | 1 | 46.28 |
| 512 MHz/12 | 0 | 42.67 | 1 | 42.45 |
| 512 MHz/13 | 0 | 39.38 | 1 | 39.20 |
| 512 MHz/14 | 0 | 36.57 | 1 | 36.41 |
| 512 MHz/15 | 0 | 34.13 | 1 | 33.99 |
| 512 MHz/16 | 0 | 32.00 | 1 | 31.88 |
| 512 MHz/17 | 0 | 30.12 | 1 | 30.01 |
| 512 MHz/18 | 0 | 28.44 | 1 | 28.35 |

TABLE 1-continued

| PZC Frequency (HFS Freq/N) | Delay (SEL) | ZWC Frequency (MHz) | Delay (SEL) | ZWC Frequency (MHz) |
|---|---|---|---|---|
| 512 MHz/19 | 0 | 26.95 | 1 | 26.77 |
| | 2 | 26.60 | 3 | 26.43 |
| | 4 | 26.26 | | |

The resulting zoned write clock ZWC allows data to be written to the disc 10 at a relatively constant linear bit density and without abrupt changes in bit density. Having less than 100 zones reduces complexity of the write clock generator 34.

Figure 9:
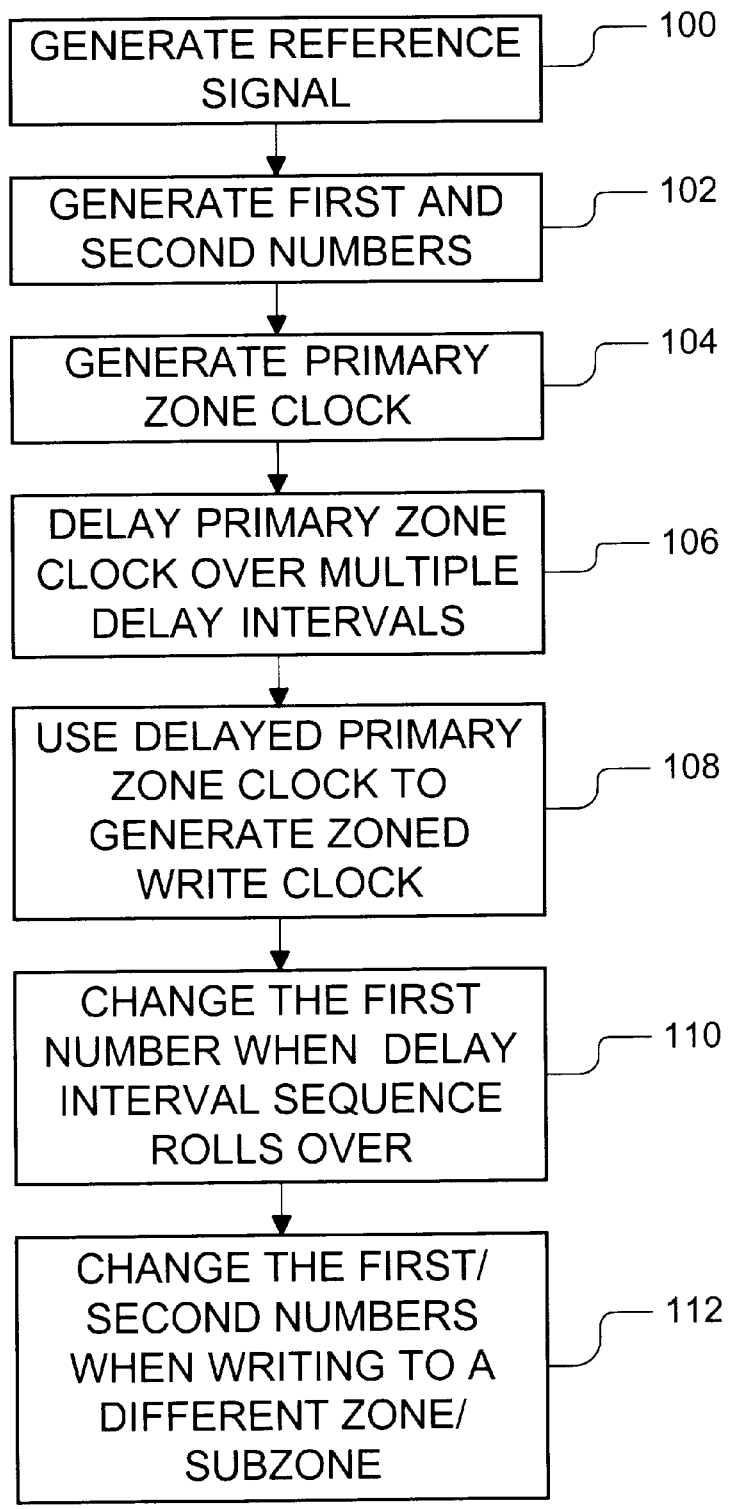
FIG. 9 is a flowchart of a method of generating a zoned write clock according to the present invention.

FIG. 9 shows a method of generating a zoned write clock for a read/write drive. A digital reference signal having a frequency that is proportional to angular rotation rate is generated (block 100). Before new data is written to a new write address, first and second non-zero numbers are generated (block 102). The first and second numbers correspond to a primary zone and subzone in which the new write address lies.

A primary zone clock is then generated from the reference signal (block 104). The primary zone clock has a period that is inversely proportional to reference signal frequency divided by the first number.

The primary zone clock is delayed over a plurality of delay intervals (block 106), and the delayed primary zone clocks are used to generate the zoned write clock (block 108). The zoned write clock has a period determined by the period of the primary zone clock and delay interval. The delay intervals are chosen in a sequence to maintain a relatively constant period of the zoned write clock.

The drive changes the first number when a delay interval sequence rolls over (block 110). The first number is changed such that the period of the zoned write clock remains relatively constant.

New first/second numbers are generated when new data is written to a different primary zone/subzone (block 112) and the steps shown in blocks 104 to 110 are repeated. Consequently, the frequency of the zoned write clock is changed to correspond to the new primary zone/subzone.

Thus disclosed is a read/write drive that allows new data to be written at a constant linear density to an optical disc that is rotated at a constant angular velocity. Moreover, the new data may be written to the disc without the use of edit gaps.

Although the invention was described above in connection with a DVD drive, it is not so limited. The invention could be applied to CD drives and other types of read/write drives.

The invention is not limited to the specific embodiments described and illustrated above. For example, the primary zone clocks PZC could be delayed by digital rather than analog techniques. The drive 14 could increment the frequency of the zoned write clock ZWC from 25.6 MHz to 64 MHz by subtracting delay intervals decrementing the divisor N instead of adding delay intervals and incrementing the divisor N.

Figure 10:
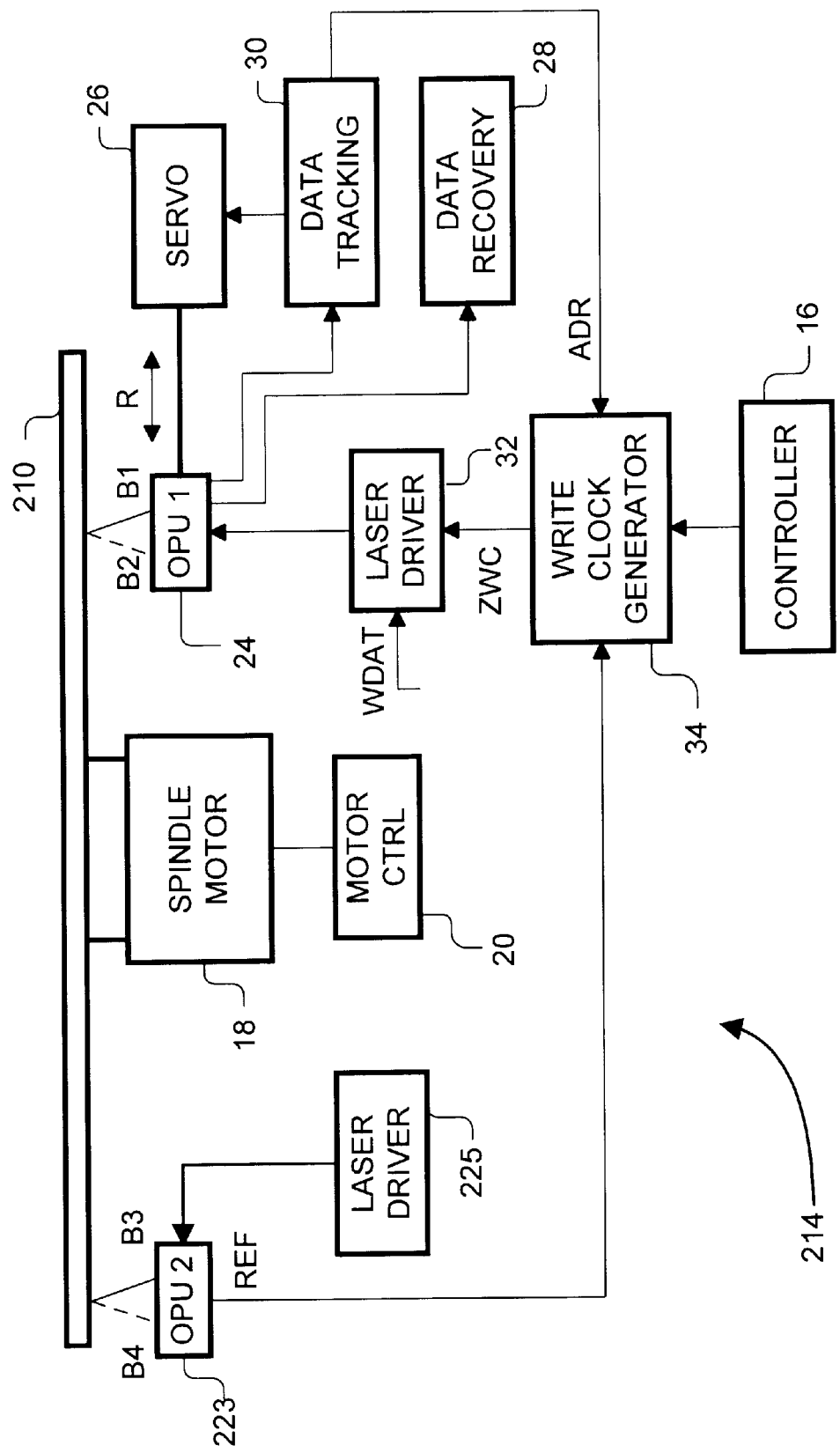
FIG. 10 is a block diagram of an alternative embodiment of the read/write drive according to the present invention.

The read/write drive is not limited to an encoder for generating the reference signal. FIG. 10 shows, for example, that the reference signal REF may be generated in a read/write drive 200 by a second optical pickup unit 223. The second optical pickup unit 223 detects a reference track on an optical disc 210. A second laser driver 234 causes a laser in a second optical pickup unit 223 to generate a beam B3 having a fixed power level of about 1 milliwatt. An optics assembly in the second optical pickup unit 223 focuses the beam B3 onto the reference track. A photodetector in the second optical pickup unit 223 detects a beam B4 of light modulated by the reference track. The detector in the second optical pickup unit 223 converts the modulated beam B4 into the reference signal REF having a frequency that is proportional to the angular rate of the disc 10.

The second optical pickup unit 223 does not need the resolution of the primary optical pickup unit and, therefore, can be manufactured at a lower cost than the other optical pickup unit 24. Certain devices capable of reading both DVDs and CDs might already have two optical pickup units: a primary unit corresponding to the DVD and a second optical pickup unit corresponding to the CD. Such devices could be adapted by using one optical pickup unit 24 to read and write data from a DVD and by using the other optical pickup 223 unit to read the reference track 211.

Figure 11:
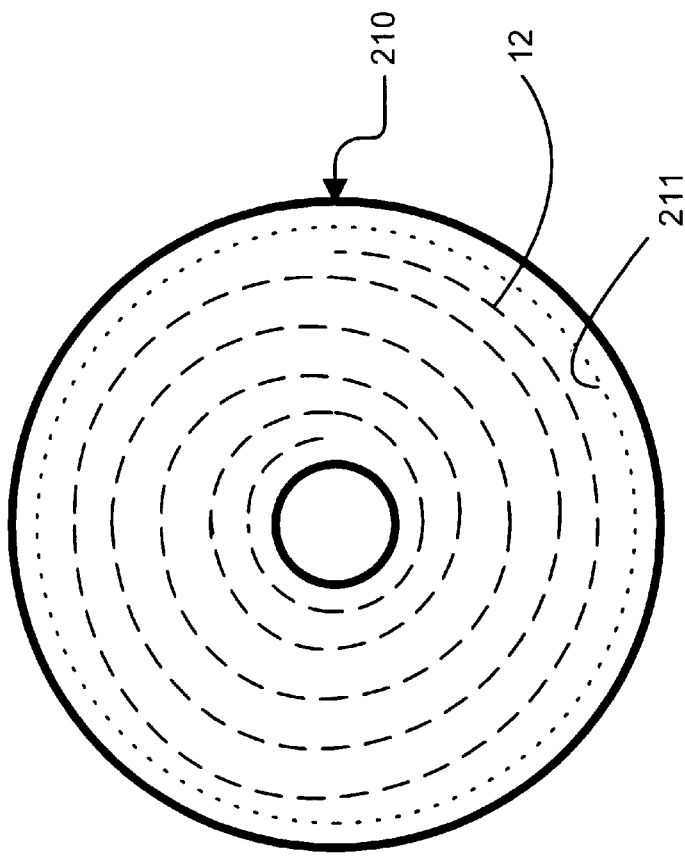
FIG. 11 is an illustration of an optical disc for the read/write drive of FIG. 10.

The reference track 211 may be located near an outer periphery of the optical disc 210 (see FIG. 11). The reference track 211 may include a plurality of spaced-apart pits that are embossed in the disc 210. The pits in the reference track 211 can be spaced such that the reference signal REF has a frequency of about four MHz when the disc 210 is rotated at the constant angular velocity.

Locating the reference track 211 near the periphery of the disc 210 can maximize the frequency of the reference signal REF. Additionally, increasing the distance of the reference track 211 from the center of the disc 210 can allow the reference signal period to be increased and, therefore, reduces the percentage effect of any clock jitter.

Accordingly, the invention is not limited to the specific embodiments described and illustrated above. Instead, the invention is construed according to the claims that follow.

What is claimed is:

1. An optical read/write drive comprising:
   a movable optical pickup unit;
   a spindle motor;
   a motor controller for operating the spindle motor at a relatively constant angular velocity;
   a stable reference signal generator, an output of the generator providing a reference signal having a frequency that is proportional to angular velocity of the spindle motor;
   a first circuit for generating a primary zone clock, the primary zone clock having a period that is inversely proportional to reference signal frequency divided by a first non-zero number;
   a second circuit for delaying the primary zone clock over a plurality of different delay intervals and generating a zoned write clock from a sequence of the delayed primary zone clocks, an output of the second circuit providing the zoned write clock, the zoned write clock having a period determined by the period of the primary zone clock and delay interval, the delay intervals being chosen in a sequence to maintain a relatively constant period of the zoned write clock;
   a third circuit for changing the first number when the sequence rolls over, the first number being changed such that the period of the zoned write clock remains relatively constant; and
   a laser driver responsive to the zoned write clock.

2. The drive of claim 1, wherein the second circuit includes:
   a plurality of cascaded delay elements for delaying the primary zone clock by the different delay intervals;
   a multiplexer having inputs for receiving the different delayed primary zone clocks, an output of the multiplexer providing the zoned write clock; and
   a fourth circuit for causing the multiplexer to stepwise select the different delayed primary zone clocks.

3. The drive of claim 2, wherein the fourth circuit also causes the first number to change when the sequence rolls over.

4. The drive of claim 3, wherein the fourth circuit includes an M-bit adder for generating a sum, the sum being supplied to a select line of the multiplexer; and wherein the third circuit changes the first number in response to a carryout by the M-bit adder, the carryout indicating that the sequence has rolled over.

5. The drive of claim 2, further comprising means for generating an initial value for the first number and a step size for stepwise selecting the different delayed primary zone clocks, whereby a zoned write clock having a plurality of selectable discrete frequencies can be generated.

6. The drive of claim 5, wherein a plurality of primary zones are assigned to a read/write medium, wherein a plurality of subzones are assigned to each primary zone, and wherein each discrete frequency corresponds to each subzone of a primary zone.

7. The drive of claim 5, wherein the total number of discrete frequencies is less than about 100.

8. The drive of claim 2, further comprising means for accumulating an error from the plurality of delay elements; and means for adjusting the delay interval of at least one of the delay elements according to the accumulated error.

9. The drive of claim 2, further comprising a fourth circuit including an additional delay element cascaded with the plurality of delay elements of the second circuit; a phase detector for comparing phase differences between the primary zone clock and an output of the additional delay element; and means for adjusting the plurality of delay elements until the output of the phase detector is nulled.

10. The drive of claim 1, wherein the reference generator includes a shaft encoder.

11. The drive of claim 1, wherein the reference generator includes a second optical pickup unit.

12. Apparatus for writing data to an optical disc, the apparatus comprising:
    first means for rotating the disc at a relatively constant angular velocity;
    second means for generating a reference signal having a frequency that is proportional to angular velocity of the disc;
    third means for generating a primary zone clock from the first signal, period of the primary zone clock being inversely proportional to reference signal frequency divided by a first number, the first number initially corresponding to a primary zone of the disc in which the data is first written;
    fourth means for delaying the primary zone clock over a plurality of delay intervals;
    fifth means for using the delayed primary zone clocks to generate the zoned write clock, the zoned write clock having a period determined by the period of the primary zone clock and delay interval, the delay intervals being chosen in a sequence to maintain a relatively constant period of the zoned write clock, an output of the fifth means providing the zoned write clock;
    sixth means for changing the first number when a sequence of the delay intervals rolls over, the first number being changed such that the period of the zoned write clock remains relatively constant;

a laser driver having an input coupled to the output of the fifth means; and a laser responsive to the laser driver.

13. A clock generator for generating a zoned clock in response to a reference signal, the write clock generator comprising:

a first circuit for generating a primary clock, the primary clock having a period that is inversely proportional to reference signal frequency divided by a first non-zero number;

a second circuit for delaying the primary clock over a plurality of different delay intervals and generating the zoned clock from a sequence of the delayed primary clocks, an output of the second circuit providing the zoned clock, the zoned clock having a period determined by the period of the primary clock and delay interval, the delay intervals being chosen in a sequence to maintain a relatively constant period of the zoned clock; and a third circuit for changing the first number when the sequence of the delay intervals rolls over, the first number being changed such that the period of the zoned clock remains relatively constant.

14. The clock generator of claim 13, wherein the second circuit includes:

a plurality of cascaded delay elements for delaying the primary clock by the different delay intervals;

a multiplexer having inputs for receiving the different delayed primary clocks, an output of the multiplexer providing the zoned clock; and a fourth circuit for causing the multiplexer to stepwise select the different delayed primary clocks.

15. The clock generator of claim 14, wherein the fourth circuit also causes the first number to change when the sequence rolls over.

16. The clock generator of claim 14, wherein the fourth circuit includes an M-bit adder for generating a sum, the sum being supplied to a select line of the multiplexer; and wherein the third circuit changes the first number in response to a carryout by the M-bit adder, the carryout indicating that the sequence has rolled over.

17. The clock generator of claim 13, further comprising means for generating an initial value for the first number and a step size for stepwise selecting the different delayed primary zone clocks.

18. The clock generator of claim 13, further comprising means for accumulating an error from the plurality of delay elements; and means for adjusting the delay interval of at least one of the delay elements according to the accumulated error.

19. The clock generator of claim 13, further comprising a fourth circuit including an additional delay element cascaded with the plurality of delay elements of the second circuit; a phase detector for comparing phase differences between the primary clock and an output of the additional delay element; and means for adjusting the plurality of delay elements until the output of the phase detector is nulled.

20. A method of generating a zoned write clock for an optical read/write drive, the drive including an optical pickup unit that is movable relative to an optical disc, the method comprising the steps of;

generating a digital reference signal having a frequency that is proportional to angular rotation rate of the disc;

generating a primary zone clock having a period that is inversely proportional to reference signal frequency divided by a first number, the first number corresponding to a primary zone on the disc;

delaying the primary zone clock over a plurality of delay intervals;

using the delayed primary zone clocks to generate the zoned write clock, the zoned write clock having a period determined by the primary zone clock and delay interval, the delay interval being chosen in a sequence to maintain a relatively constant period of the zoned write clock; and changing the first number when a sequence of the delay intervals rolls over, the first number being changed such that the period of the zoned write clock remains relatively constant.

21. The method of claim 20, wherein the primary zone clock is delayed by a plurality of delay elements, and wherein the method further comprises the steps of accumulating an error from the plurality of delay elements; and adjusting the delays intervals of at least one of the delay elements according to the accumulated error.

* * * * *